United States Patent
Yamada et al.

(10) Patent No.: US 10,805,485 B2
(45) Date of Patent: Oct. 13, 2020

(54) IMAGE FORMING APPARATUS

(71) Applicant: SHARP KABUSHIKI KAISHA, Sakai, Osaka (JP)

(72) Inventors: Nobuyasu Yamada, Sakai (JP); Takashi Nakagawa, Sakai (JP); Nobuyuki Ueda, Sakai (JP); Yuki Watanabe, Sakai (JP); Masaya Asakawa, Sakai (JP); Takashi Sawano, Sakai (JP); Kumiko Ogino, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/224,476

(22) Filed: Dec. 18, 2018

(65) Prior Publication Data
US 2019/0199871 A1 Jun. 27, 2019

(30) Foreign Application Priority Data
Dec. 22, 2017 (JP) ................................. 2017-246576

(51) Int. Cl.
H04N 1/00 (2006.01)
(52) U.S. Cl.
CPC ..... H04N 1/00482 (2013.01); H04N 1/00694 (2013.01); H04N 1/00925 (2013.01); H04N 2201/0094 (2013.01)

(58) Field of Classification Search
CPC ....................... H04N 1/00482; H04N 1/00694
See application file for complete search history.

(56) References Cited

U.S. PATENT DOCUMENTS

| | | | |
|---|---|---|---|
| 2003/0051126 A1* | 3/2003 | Numano | G06F 9/4401 713/1 |
| 2011/0074542 A1* | 3/2011 | Nabeshima | H05B 37/0272 340/5.62 |
| 2014/0376026 A1* | 12/2014 | Inui | B41J 13/0054 358/1.14 |
| 2017/0155803 A1* | 6/2017 | Nishino | G03G 15/502 |
| 2017/0279995 A1* | 9/2017 | Yamasaki | G06F 1/3231 |

FOREIGN PATENT DOCUMENTS

JP 2015-087470 A 5/2015

* cited by examiner

Primary Examiner — Ibrahim Siddo
(74) Attorney, Agent, or Firm — ScienBiziP, P.C.

(57) ABSTRACT

An image forming apparatus includes: a sheet tray; a sheet detection sensor that detects that a sheet is placed on the sheet tray; a display unit; and a control unit. In a case where the sheet detection sensor detects the sheet on the sheet tray, the control unit determines whether or not to cause the display unit to display a confirmation screen for sheet setting. In a case where a predetermined inappropriate confirmation condition is satisfied, the control unit causes the display unit not to display the confirmation screen. In a case where the inappropriate confirmation condition is not satisfied, the control unit causes the display unit to display the confirmation screen.

9 Claims, 10 Drawing Sheets

IMAGE FORMING APPARATUS

BACKGROUND

1. Field

The present disclosure relates to an image forming apparatus.

2. Description of the Related Art

Some sheet feeding trays of image forming apparatuses, particularly manual feeding trays, do not have an automatic sheet size detection function due to problems such as increased costs.

In such an image forming apparatus, the conveyance of and fixing on a sheet are controlled in accordance with the sheet size and the sheet type which are set in advance by a user. However, in a case where a sheet different from the sheets defined by the setting is placed on the sheet feeding tray, problems such as a paper jam and a fixing error may occur.

In order to address such a problem, in the related art, there is an image forming apparatus that assists a user to input paper type information or size information of a sheet placed on the manual feeding tray by causing a manual sheet setting screen to pop up on a display portion of an operation panel if it is detected that a sheet has been placed on the manual feeding tray (for example, refer to Japanese Unexamined Patent Application Publication No. 2015-87470).

However, if a confirmation screen consistently pops up on the display portion each time a sheet is placed on the sheet feeding tray, the confirmation screen not only interferes with a user operation but may also suppress a serious error notification or the like from being displayed. As a result, there is a possibility that this configuration may be inconvenient for the user.

It is desirable to provide an image forming apparatus capable of being more convenient than that of the related art by displaying a confirmation screen for sheet setting to a user at an appropriate timing in accordance with the user's usage situation.

SUMMARY

According to an aspect of the present disclosure, there is provided an image forming apparatus including: a sheet tray; a sheet detection sensor that detects that a sheet is placed on the sheet tray; a display unit; and a control unit. The control unit determines whether or not to cause the display unit to display a confirmation screen for sheet setting in a case where the sheet detection sensor detects the sheet on the sheet tray, causes the display unit not to display the confirmation screen in a case where a predetermined inappropriate confirmation condition is satisfied, and causes the display unit to display the confirmation screen in a case where the inappropriate confirmation condition is not satisfied.

Figure 1:
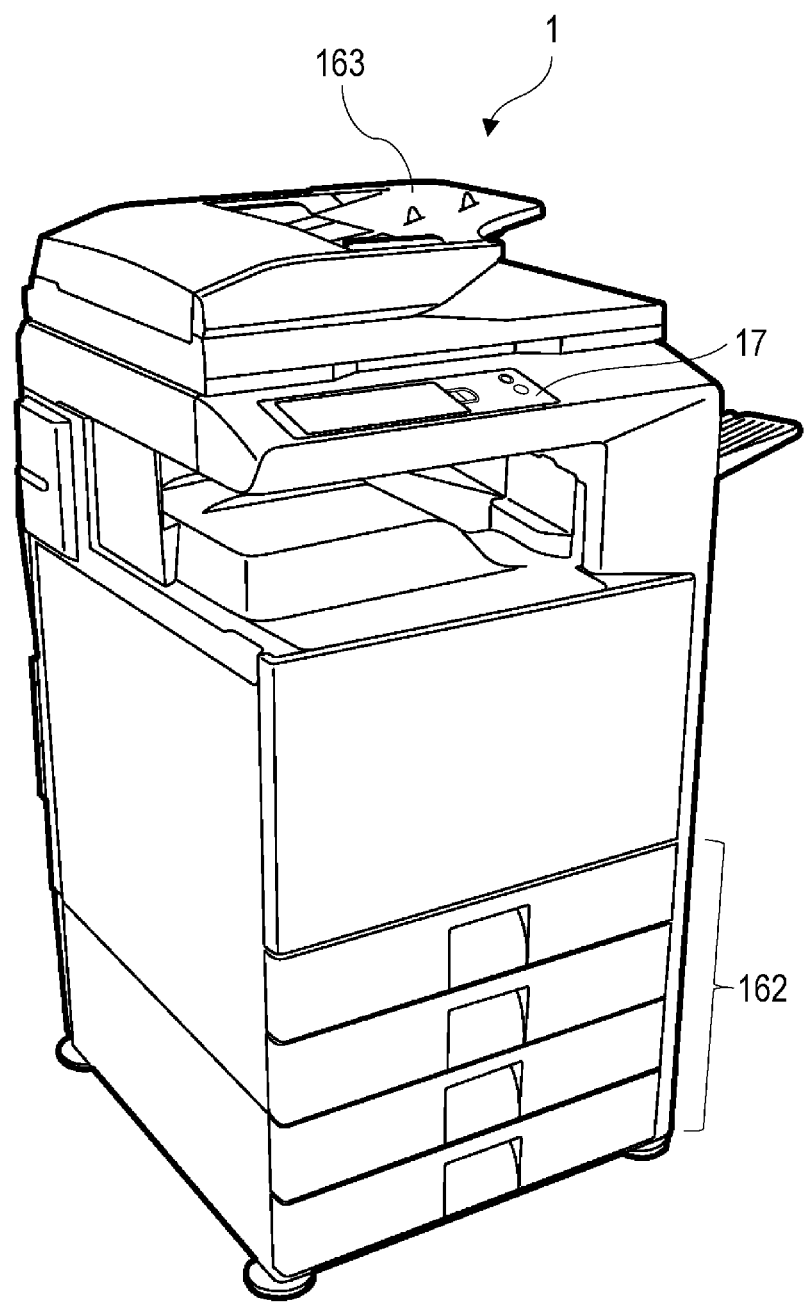
FIG. 1 is a perspective view illustrating an appearance of a digital multi-function peripheral according to an embodiment of the present disclosure.

DESCRIPTION OF THE EMBODIMENTS (1) An image forming apparatus according to the present disclosure includes: a sheet tray; a sheet detection sensor that detects that a sheet is placed on the sheet tray; a display unit; and a control unit. In a case where the sheet detection sensor detects the sheet on the sheet tray, the control unit determines whether or not to cause the display unit to display a confirmation screen for sheet setting. In a case where a predetermined inappropriate confirmation condition is satisfied, the control unit causes the display unit not to display the confirmation screen. In a case where the inappropriate confirmation condition is not satisfied, the control unit causes the display unit to display the confirmation screen.

In the present disclosure, the term "sheet tray" denotes a predetermined tray such as a manual feeding tray or a sheet feeding cassette. Note that the number of sheet trays is not limited to one, and a plurality of sheet trays may be used.

The expression "confirmation screen for sheet setting" denotes a confirmation screen for sheet setting of a type, a size, and the like of a sheet.

The term "inappropriate confirmation condition" denotes a condition where it is inappropriate to display a confirmation screen for sheet setting.

Further, preferable embodiments of the present disclosure will be described.

(2) In the image forming apparatus of the present disclosure, the inappropriate confirmation condition may include a case where the display unit is displaying a sheet setting screen.

In such a manner, in a case where the sheet setting screen is displayed in advance, there is no need to display the confirmation screen for sheet setting again. Thus, it is possible to realize an image forming apparatus which is more convenient than that in the related art.

(3) In the image forming apparatus of the present disclosure, the inappropriate confirmation condition may include a case where the display unit is displaying a predetermined operating instruction or a predetermined message.

Here, the term "the predetermined operating instruction or the predetermined message" denotes, for example, an instruction manual or a message to the user.

In such a manner, in a case where an instruction manual or a message to the user is being displayed, the display of the confirmation screen for sheet setting does not interfere with the display of the instruction manual or the message. Thus, it is possible to realize an image forming apparatus which is more convenient than that in the related art.

(4) The image forming apparatus of the present disclosure may further include a user authentication unit, and the inappropriate confirmation condition may include a case where user authentication is not performed by the user authentication unit.

Here, the expression "the user authentication is not performed by the user authentication unit" denotes, for example, a state in which the user has not logged in to the image forming apparatus.

In such a manner, there is no need to display the confirmation screen for sheet setting before user authentication, and the display of the confirmation screen does not interfere with the authentication screen. Thus, it is possible to realize an image forming apparatus which is more convenient than that in the related art.

(5) The image forming apparatus of the present disclosure may further include an error notification unit, and the inappropriate confirmation condition may include a case where the error notification unit is displaying an error notification.

In such a manner, the display of the confirmation screen does not interfere with confirmation of the error display or the setting for the error display. Thus, it is possible to realize an image forming apparatus which is more convenient than that in the related art.

(6) The image forming apparatus of the present disclosure may further include a power saving mode switching unit, and the inappropriate confirmation condition may include a case where the power saving mode switching unit performs switching to a power saving mode.

In such a manner, the power saving mode is not canceled by displaying the confirmation screen during the switching to the power saving mode. Thus, it is possible to realize an image forming apparatus which is more convenient than that in the related art.

(7) In the image forming apparatus of the present disclosure, the inappropriate confirmation condition may include a case where image formation is being executed from the sheet tray.

In such a manner, in a case where the image formation is being executed from the sheet tray, there is no need to change the sheet setting. Thus, by not displaying the confirmation screen, it is possible to realize an image forming apparatus which is more convenient than that in the related art.

(8) In the image forming apparatus of toe present disclosure, in a case where the sheet detection sensor stops detecting the sheet placed on the sheet tray after the display unit displays the confirmation screen, the control unit may keep the display unit displaying the confirmation screen.

In such a manner, in a case where the sheet detection sensor stops detecting the sheet to be placed on the sheet tray due to the sheets running out or the like, there is a low possibility that the type of the sheet is to be changed. Thus, by keeping the confirmation screen for sheet setting displayed before sheets run out, it is possible to realize an image forming apparatus which is more convenient than that in the related art.

Hereinafter, the present disclosure will be described in detail with reference to the drawings. The following description is just an example in all respects and is not construed as limiting the present disclosure.

Embodiment 1

An overview of a digital multi-function peripheral 1 as an example of the image forming apparatus including the image forming apparatus of the present disclosure will be described with reference to FIGS. 1 to 4.

Figure 2:
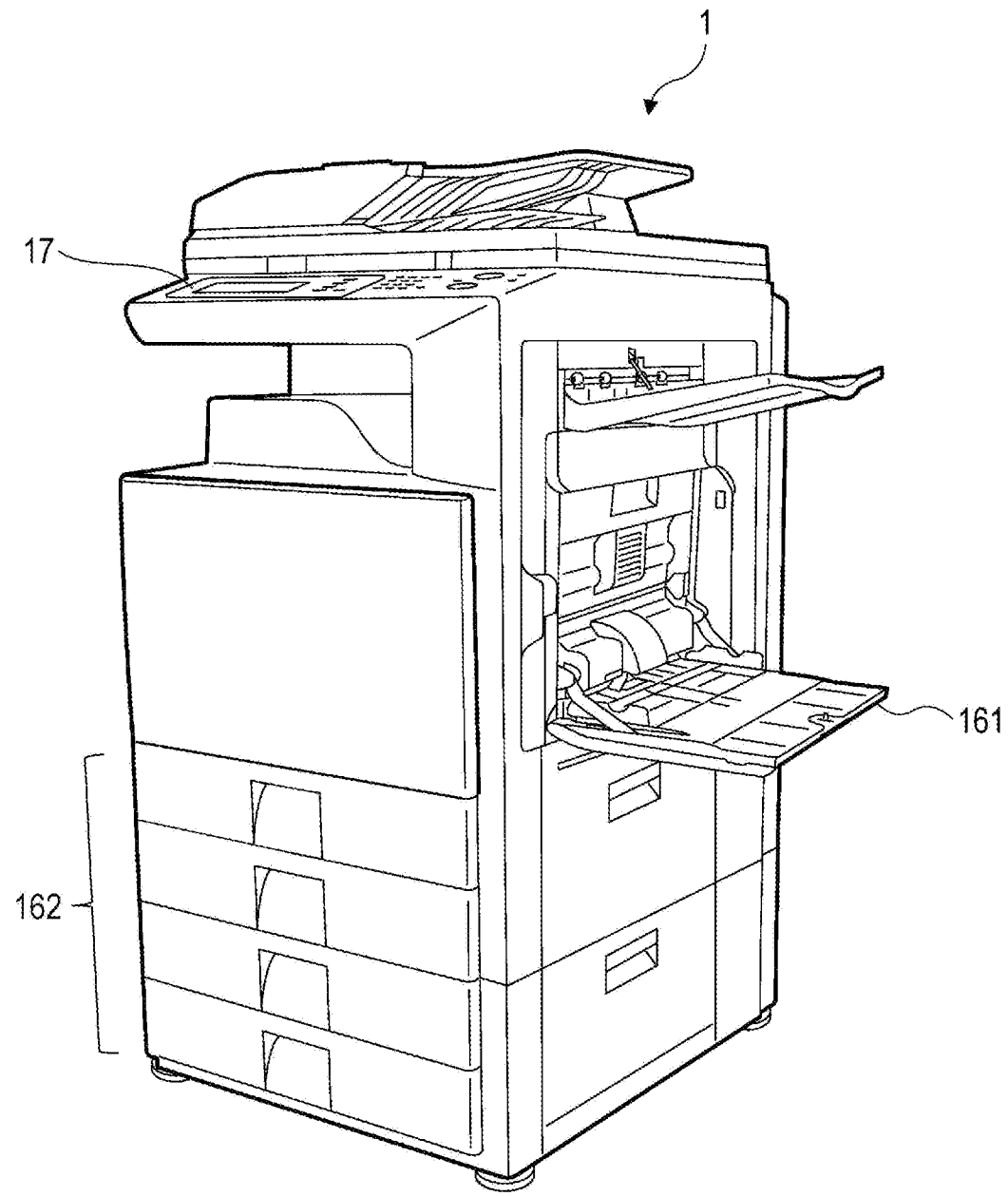
FIG. 2 is a perspective view of the digital multi-function peripheral of FIG. 1 as viewed from another angle.
Figure 3:
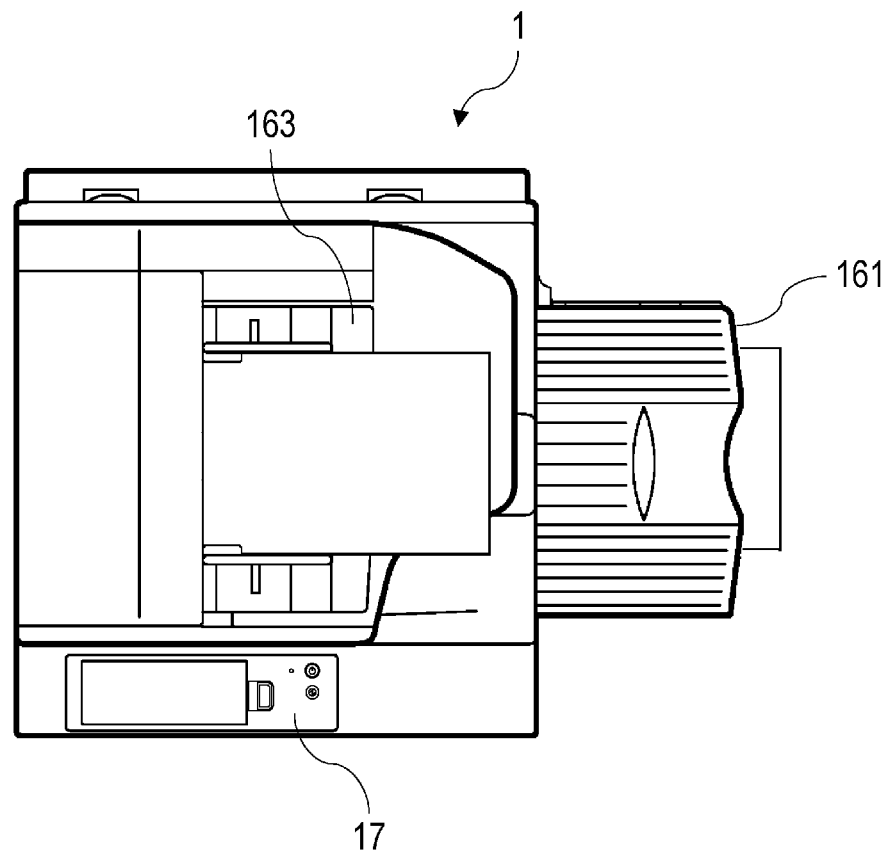
FIG. 3 is a plan view of the digital multi-function peripheral of FIG. 1.
Figure 4:
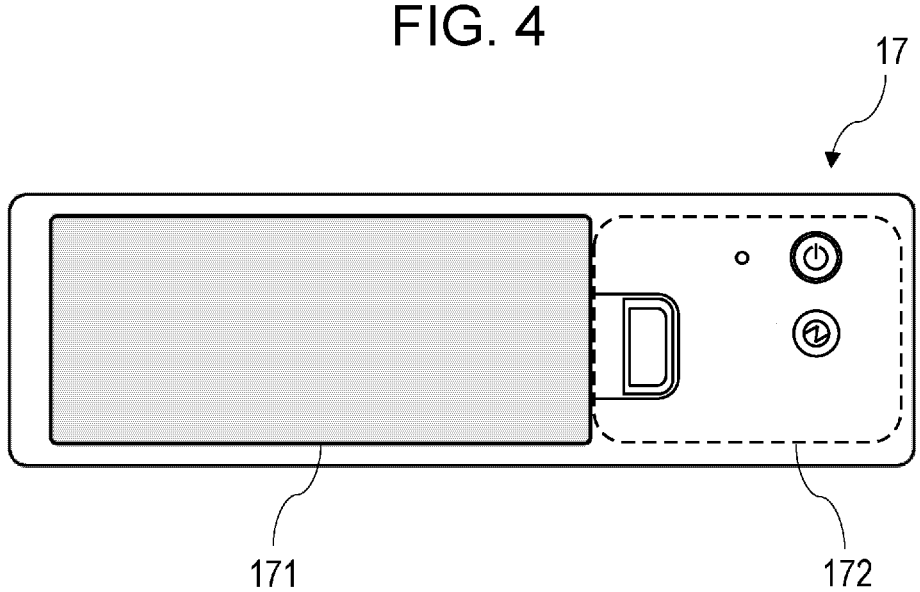
FIG. 4 is an explanatory diagram illustrating a panel unit of the digital multi-function peripheral of FIG. 1.

FIG. 1 is a perspective view illustrating an appearance of the digital multi-function peripheral 1 of the present disclosure. FIG. 2 is a perspective view of the digital multi-function peripheral 1 of FIG. 1 as viewed from another angle. FIG. 3 is a plan view of the digital multi-function peripheral 1 of FIG. 1. FIG. 4 is an explanatory diagram illustrating an example of a panel unit 17 of FIG. 1.

The digital multi-function peripheral 1 has a copying function, a scanner function, and a facsimile function and is an apparatus that digitally processes image data read from an original document and outputs the image data.

As illustrated in FIGS. 1 to 4, the digital multi-function peripheral 1 includes a manual feeding tray 161, a sheet feeding cassette 162, a document platen 163, and the panel unit 17.

As illustrated in FIG. 4, the panel unit 17 includes a display operation unit 171 having a touch panel function and a physical operation unit 172.

Next, a schematic configuration of the digital multi-function peripheral 1 will be described with reference to FIG. 5.

Figure 5:
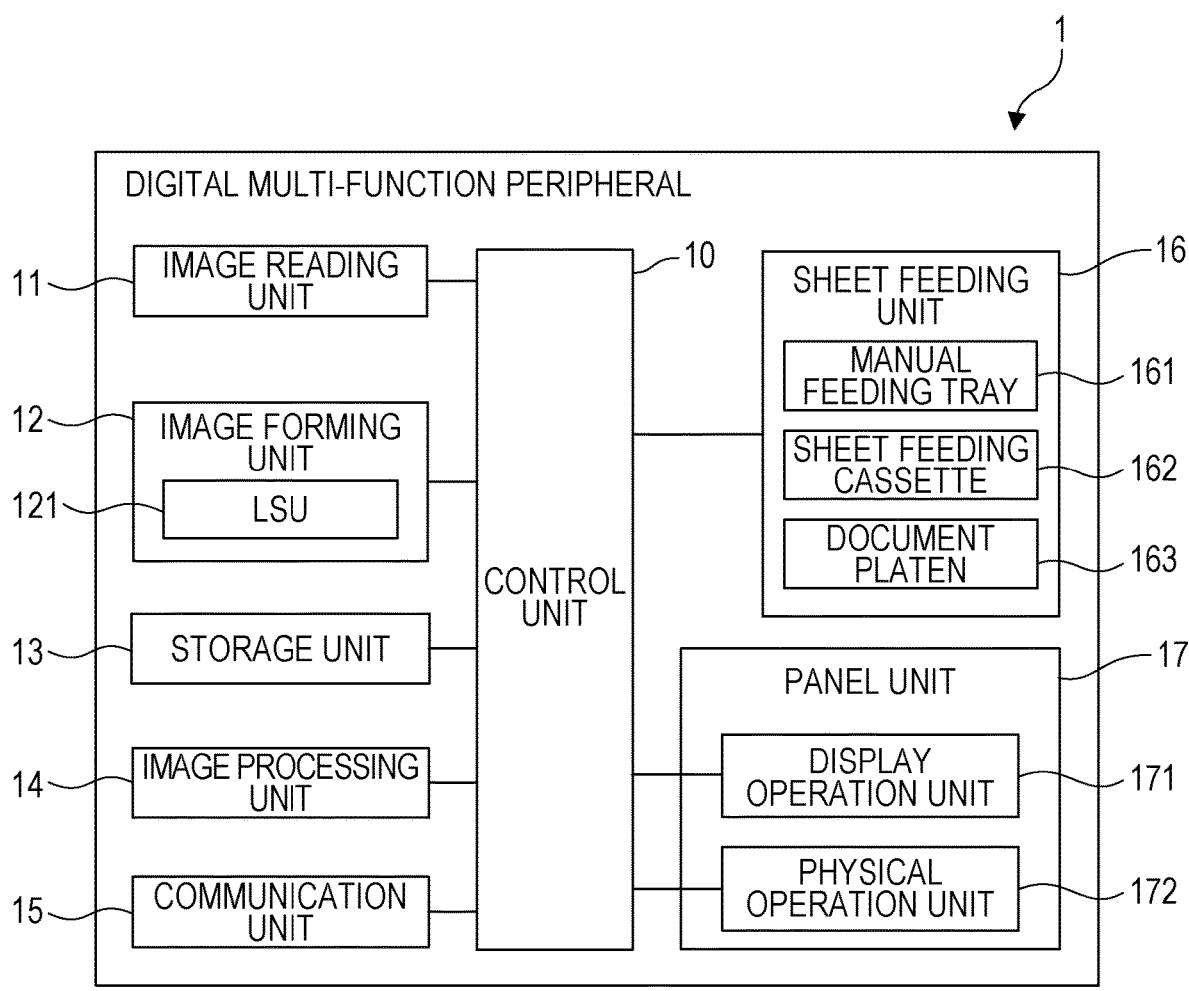
FIG. 5 is a block diagram illustrating a schematic configuration of the digital multi-function peripheral of FIG. 1.

FIG. 5 is a block diagram illustrating a schematic configuration of the digital multi-function peripheral 1 of FIG. 1.

As illustrated in FIG. 5, the digital multi-function peripheral 1 includes a control unit 10, an image reading unit 11, an image forming unit 12, a storage unit 13, an image processing unit 14, a communication unit 15, a sheet feeding unit 16, and the panel unit 17.

Components of the digital multi-function peripheral 1 will be described below.

The control unit 10 integrally controls the digital multi-function peripheral 1 and includes a CPU, a RAM, a ROM, various interface circuits, and the like.

The control unit 10 monitors and controls various detection loads of each sensor, a motor, a clutch, the panel unit 17, and the like to control operations of the entire digital multi-function peripheral 1.

The image reading unit 11 detects and reads an original document such as a card or the like placed on the document platen 163 or an original document conveyed from the sheet tray and generates image data.

The image forming unit 12 prints out the image data on a sheet and includes the LSU 121. The image data is generated by the image processing unit 14.

The LSU 121 forms an electrostatic latent image irradiating the surface of a charged photosensitive drum with laser light corresponding to image information formed by a digital signal acquired by the image reading unit 11.

The storage unit 13 is an element or a storage medium that stores information, a control program, and the like to implement various functions of the digital multi-function peripheral 1. For example, a semiconductor element such as RAM or ROM, a storage medium such as a hard disk, a flash storage unit, an SSD, or the like is used.

Note that the programs and data may be stored on different devices such that an area for holding the data is formed as a hard disk drive and an area for holding the programs is formed as a flash storage unit.

The image processing unit 14 converts the image of the document, which is read by the image reading unit 11, into an appropriate electric signal, thereby generating image data. Further, the image processing unit 14 processes the image data as an input sent from the image reading unit 11 in accordance with a command issued from the display operation unit 171 such that the image data is suitable for enlargement printing, reduction printing, or the like. Furthermore, the image processing unit 14 associates a plurality of image data pieces with one another in accordance with a predetermined layout.

The communication unit 15 communicates with a computer, a portable information terminal, an external information processing device, a facsimile device or the like through a network or the like, thereby transmitting and receiving various types of information such as mail messages and fax messages to and from these external communication devices.

The sheet feeding unit 16 conveys the sheets to the image forming unit 12. The sheets may be stored in the manual feeding tray 161, in the sheet feeding cassette 162, and on the document platen 163.

The panel unit 17 includes a liquid crystal display (LCD) and includes the display operation unit 171 and the physical operation unit 172.

The display operation unit 171 displays various kinds of information and receives instructions from the user through the touch panel function. The display operation unit 171 includes, for example, a CRT display, a liquid crystal display, an EL display, and the like and is a display device such as a monitor or a line display for displaying electronic data such as processing state data via an operating system or application software. The control unit 10 causes the display operation unit 171 to display the operation and status of the digital multi-function peripheral 1.

Overview of Display Procedure of Confirmation Screen for Sheet Setting

Next, the overview of the display procedure of the confirmation screen for sheet setting of the digital multi-function peripheral 1 according to Embodiment 1 of the present disclosure will be described with reference to FIG. 6.

Figure 6:
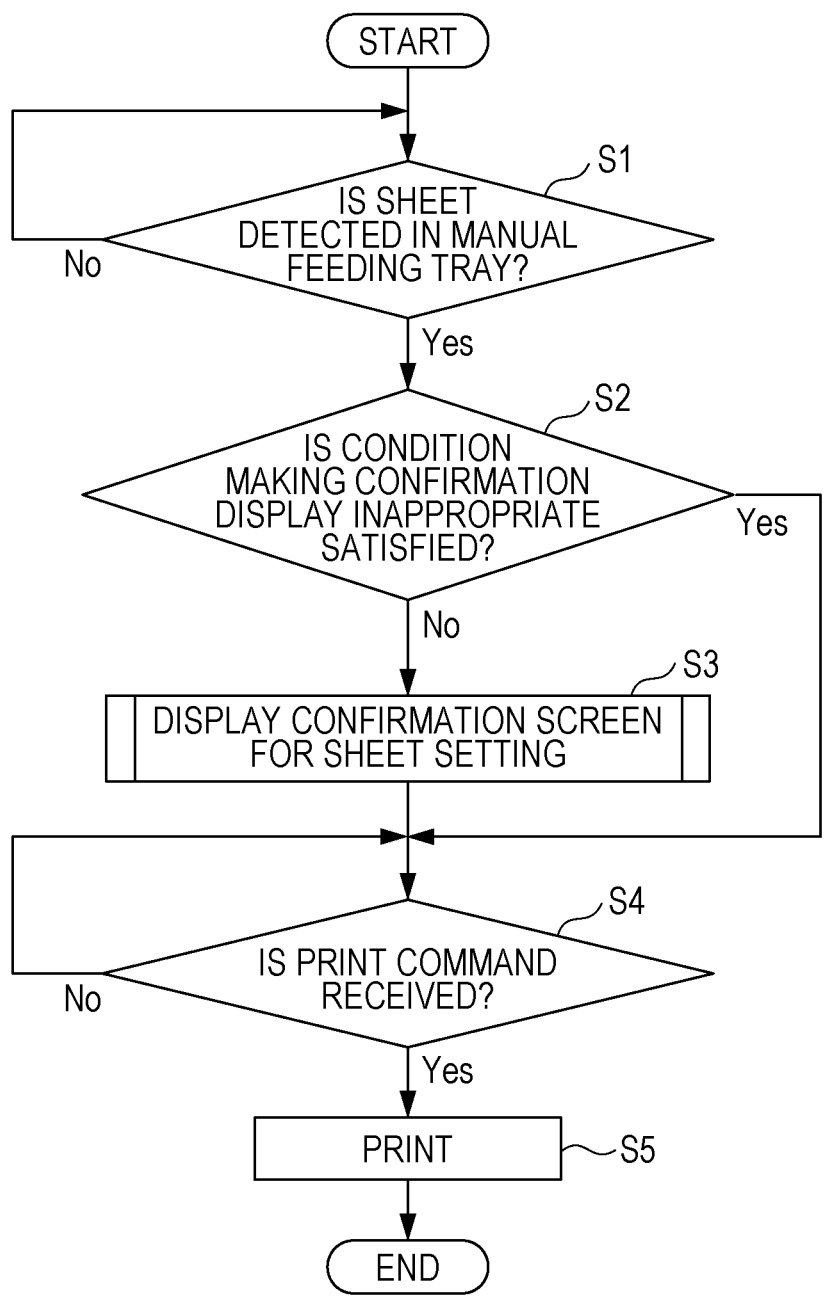
FIG. 6 is a flowchart illustrating an overview of a display procedure of a confirmation screen for sheet setting of the digital multi-function peripheral of FIG. 1.

FIG. 6 is a flowchart illustrating an overview of the display procedure of the confirmation screen for sheet setting of the digital multi-function peripheral 1 of FIG. 1.

In step S1 of FIG. 6, the control unit 10 determines whether or not a sheet is detected in the manual feeding tray 161 (step S1).

If a sheet is detected in the manual feeding tray 161 (if the result of the determination in step S1 is Yes), the control unit 10 proceeds to step S2 to make a determination (step S2).

In contrast, if no sheet is detected in the manual feeding tray 161 (if the result of the determination in step S1 is No), the control unit 10 repeats the determination in step S1 (step S1).

Next, in step 32, the control unit 10 determines whether or not a condition where it is inappropriate to display a confirmation screen for predetermined sheet setting (hereinafter referred to as "inappropriate confirmation condition") is satisfied (step S2).

Table 1 below shows an example of the inappropriate confirmation conditions for sheet setting.

TABLE 1

| 1 | Sheet setting screen is already displayed |
| 2 | Instruction manual is being displayed |

TABLE 1-continued

| 3 | Login for user authentication has not been performed |
| 4 | Jam or problem notification is being displayed |
| 5 | Apparatus is stopped due to maintenance request |
| 6 | Energy saving mode is active |
| 7 | Service person mode is active |
| 8 | Printing from target tray is being executed |

The conditions in Table 1 will be described below.

1. The inappropriate confirmation conditions for sheet setting include a case of "Sheet setting screen is already displayed" since there is no need to redundantly display the confirmation screen for sheet setting.

2. The inappropriate confirmation conditions for sheet setting include a case of "instruction manual is being displayed" since there is a possibility that a user may not see the desired information if the confirmation screen for sheet setting is displayed.

3. The inappropriate confirmation conditions for sheet setting include a case of "Login for user authentication has not been performed" since there is a problem in that operations such as change of sheet setting may be performed even when the user is not logged in and there is also a possibility that the display of the confirmation screen may interfere with the login screen.

4. The inappropriate confirmation conditions for sheet setting include a case of "Jam or problem notification is being displayed" since there is a possibility that the display of the confirmation screen may interfere with display of an error having a high priority, display of the setting screen, or the like.

5. The inappropriate confirmation conditions for Sheet setting include a case of "Apparatus is stopped due to the maintenance request" since there is a possibility that the display of the confirmation screen may interfere with the display of the maintenance request having a high priority or the like.

6. The inappropriate confirmation conditions for sheet setting include a case of "Energy saving mode is active" to suppress the energy saving mode from being canceled by displaying the confirmation screen.

7. The inappropriate confirmation conditions for sheet setting include a case of "Service person mode is active" since there is a problem if the confirmation screen interferes with the setting screen by being displayed or the sheet setting is changeable during inspection by a service person.

8. The inappropriate confirmation conditions for sheet setting include a case of "Printing from the target tray is being executed" since there is a problem if the sheet setting is chanced.

Next, in step S2, if the predetermined inappropriate confirmation condition for sheet setting is satisfied (if the result of the determination in step S2 is Yes), the control unit 10 proceeds to step S4 to make a determination (step S4).

In contrast, if the predetermined inappropriate confirmation condition for sheet setting is not satisfied (if the result of the determination in step S2 is No), the control unit 10 displays the confirmation screen for sheet setting in step S3 (step S3).

Thereafter, the control unit 10 proceeds to step S4 to perform the determination (step S4).

Next, in step S4, the control unit 10 determines whether or not the display operation unit 171 or the physical operation unit 172 has received a print command (step S4).

If the display operation unit 171 or the physical operation unit 172 receives the print command (if the result of the determination in step S4 is Yes), the control unit 10 causes the image forming unit 12 to print the sheet (step S5).

Thereafter, the control unit 10 ends the processing.

In contrast, if the display operation unit 171 or the physical operation unit 172 does not receive the print command (if the result of the determination in step S4 is No), the control unit 10 repeats the determination in step S4 (step S4).

Next, details of the display of the confirmation screen for sheet setting in step S3 of FIG. 6 will be described with reference to FIGS. 7 to 10.

Figure 7:
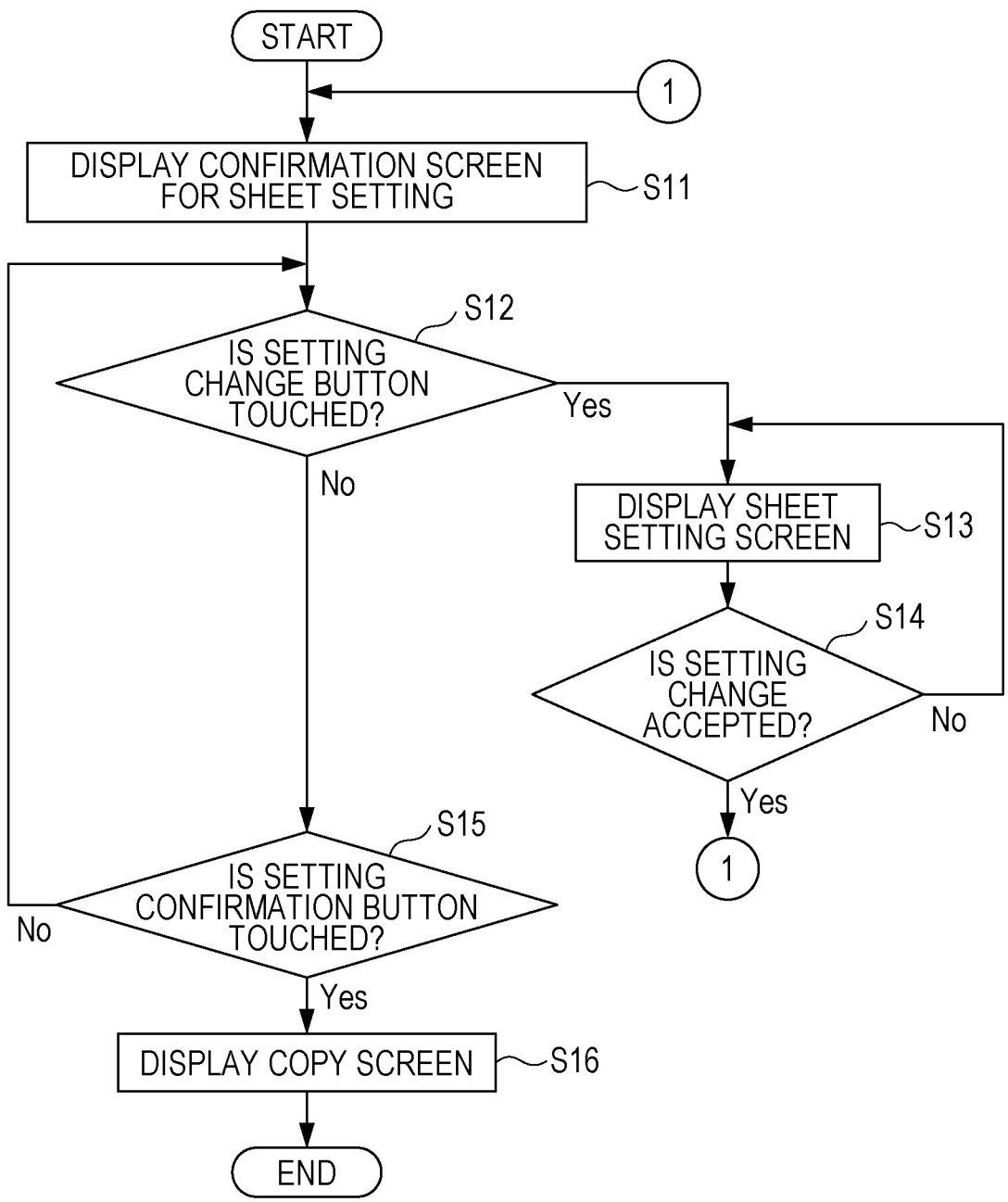
FIG. 7 is a flowchart illustrating an example of the display procedure of the confirmation screen for sheet setting of FIG. 6.
Figure 8:
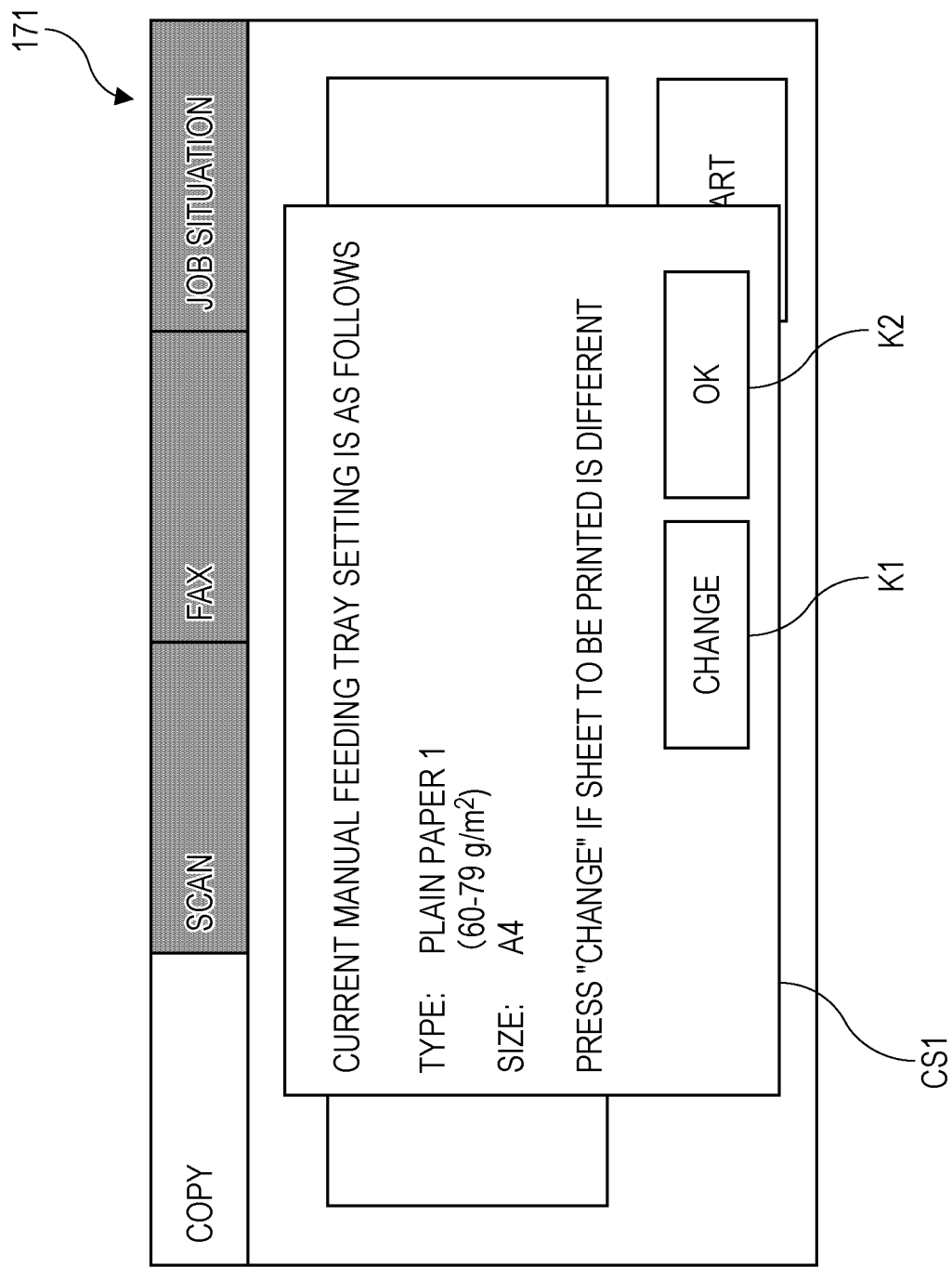
FIG. 8 is an explanatory diagram illustrating an example of the confirmation screen for sheet setting of the digital multi-function peripheral of FIG. 1.
Figure 9:
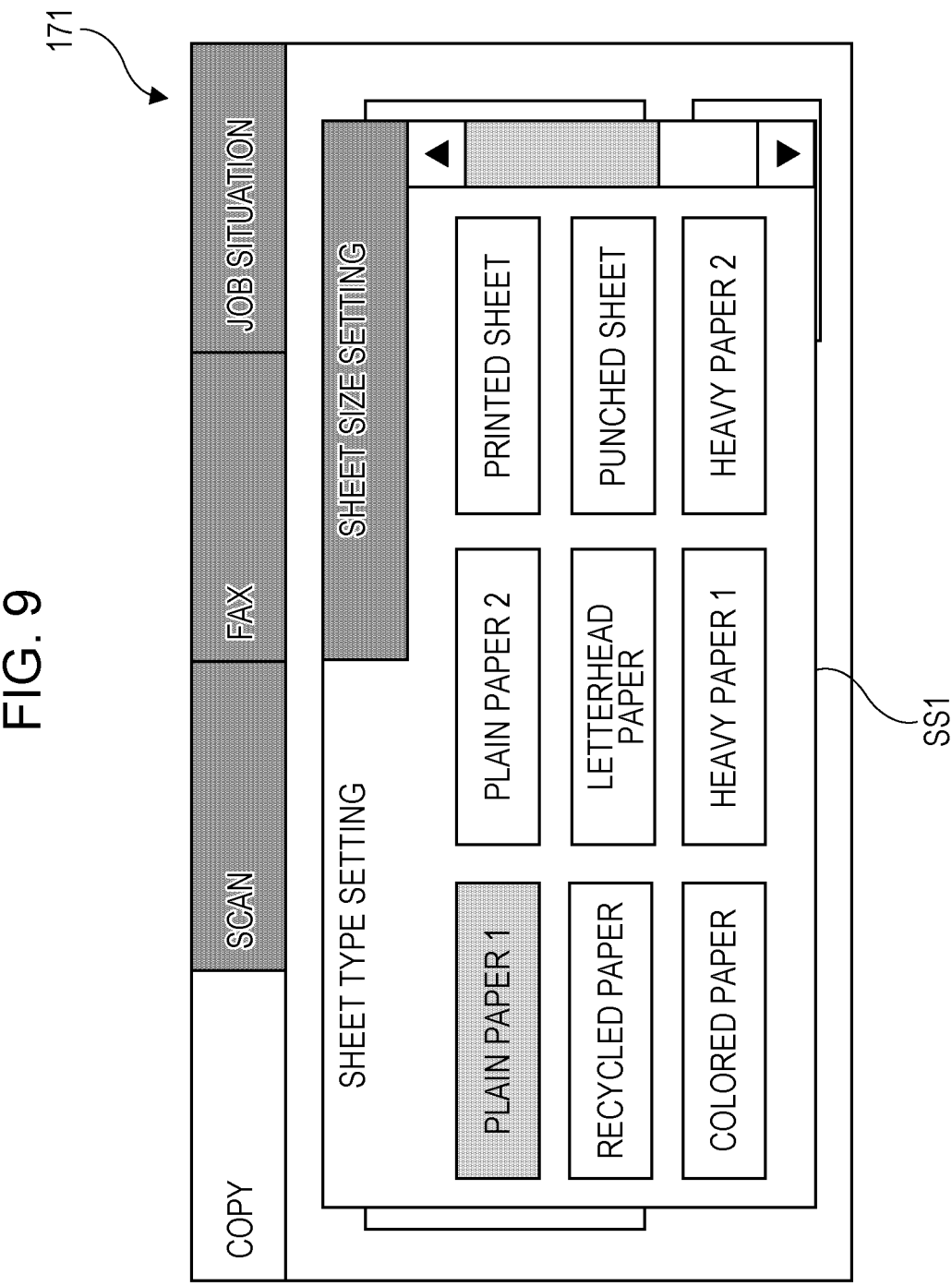
FIG. 9 is as explanatory diagram illustrating as example of a sheet setting screen of the digital multi-function peripheral of FIG. 1.
Figure 10:
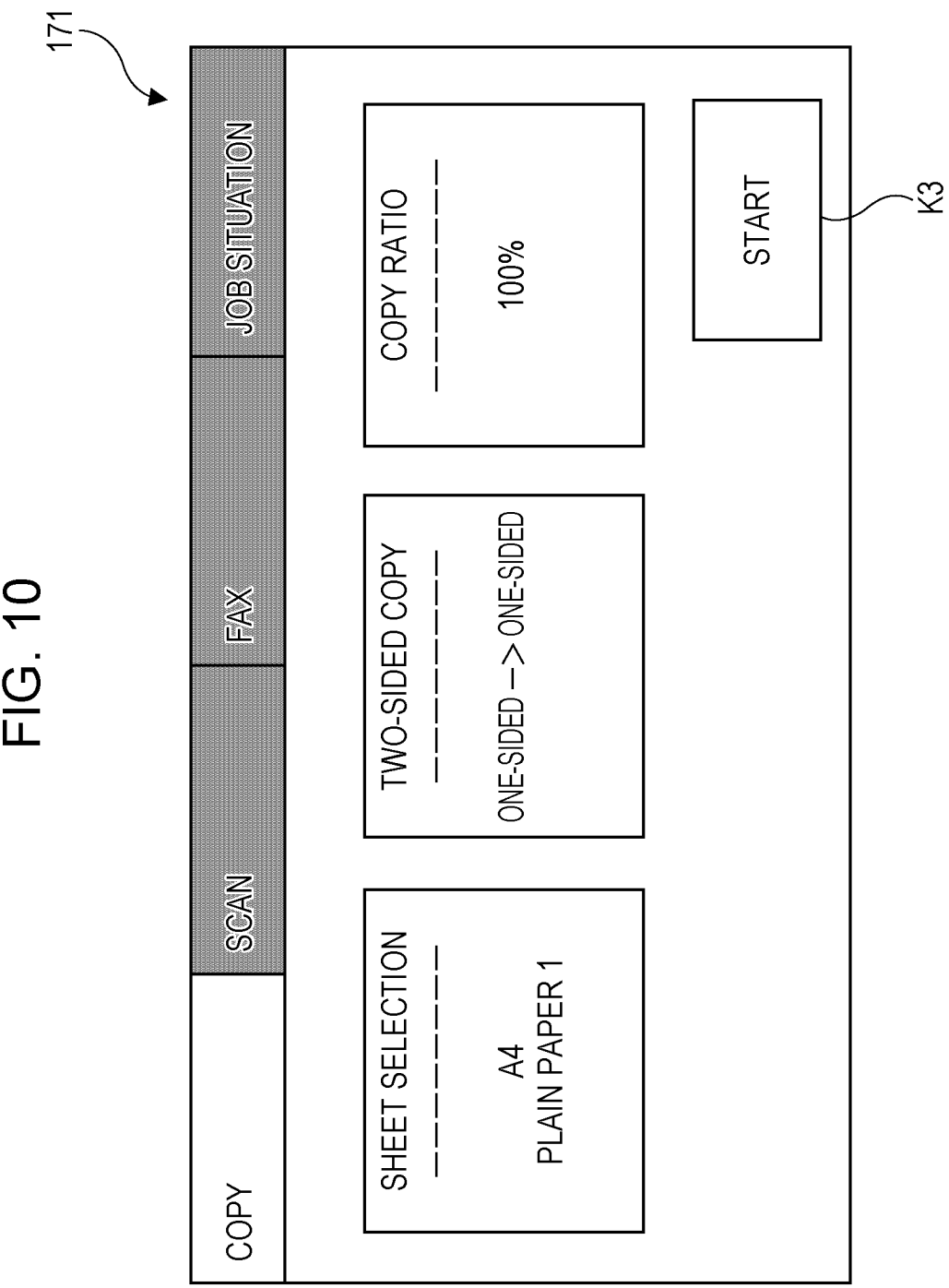
FIG. 10 is an explanatory diagram illustrating an example of a copy screen of the digital multi-function peripheral of FIG. 1.

FIG. 7 is a flowchart illustrating an example of the display procedure of the confirmation screen for sheet setting in FIG. 6. FIG. 8 is an explanatory diagram illustrating an example of a confirmation screen for sheet setting of the digital multi-function peripheral 1 in FIG. 1. FIG. 9 is an explanatory diagram illustrating an example of the sheet setting screen of the digital multi-function peripheral 1 in FIG. 1. FIG. 10 is an explanatory diagram illustrating an example of a copy screen of the digital multi-function peripheral 1 in FIG. 1.

If a sheet is detected in the manual feeding tray 161, the control unit 10 causes the confirmation screen for sheet setting to be displayed in step S11 of FIG. 7 (step S11).

FIG. 8 is an example of a confirmation screen CS1 for sheet setting popping up on the display operation unit 171.

The confirmation screen CS1 displays "Type: plain paper 1 (60-79 g/m$^2$)" indicating the type of the sheet and "Size: A4" indicating the size of the sheet together with a message "Current manual feeding tray setting is as follows".

In addition, a change button K1 and an OK button K2 are displayed together with a message "Press [change] if a sheet to be printed is different".

Next, in step S12 of FIG. 7, the control unit 10 determines whether or not the setting change button is touched (step S12).

If the setting change button is touched (if the result of the determination in step S12 is Yes), the control unit 10 causes the sheet setting screen to be displayed in step S13 (step S13).

In contrast, if the setting change button is not touched (if the result of the determination in step S12 is No), the control unit 10 proceeds to step S15 to make a determination (step S15).

FIG. 9 is an example of the sheet setting screen SS1 popping up on the display operation unit 171.

On the sheet setting screen SS1, there are two tabs corresponding to "Sheet type setting" and "Sheet size setting". In the example of FIG. 9, the "Sheet type setting" tab is displayed, and the "Plain paper 1" is selected.

If a user desires to change the sheet type, the user touches another button such as the "Plain paper 2".

If the user desires to change the sheet size, the user selects the "Sheet size setting" tab and then touches the button corresponding to the desired sheet size.

Next, in step S14 of FIG. 7, the control unit 10 determines whether or not the display operation unit 171 accepts the setting change (step S14).

If the display operation unit 171 accepts the setting change (if the result of the determination in step S14 is Yes), the control unit 10 repeats the processing of step S11 (step S11).

In contrast, if the display operation unit 171 does not accept the setting change (if the result of the determination in step S14 is No), the control snit 10 repeats the determination in step S13 (step S13).

In the example of FIG. 9, in a case of changing from the "Plain paper 1" to the "Plain paper 2", the control unit 10 causes a confirmation screen CS2 for sheet setting, which is changed to "Type: plain paper 2", to pop up on the display operation unit 171.

Next, in step S15 of FIG. 7, the control unit 10 determines whether or not the setting confirmation button is touched (step S15).

If the setting confirmation button is touched (if the result of the determination in step S15 is Yes), the control unit 10 causes the copy screen to be displayed in step S16 (step S16).

Subsequently, the control unit 10 ends the processing of displaying the confirmation screen for sheet setting.

In contrast, if the setting confirmation button is not touched (if the result of the determination in step S15 is No), the control unit 10 repeats determination in step S12 (step S12).

In the example of FIG. 8, if the OK button K2 as the setting confirmation button is pressed, the control unit 10 causes the copy screen to be displayed as illustrated in FIG. 10.

Thereafter, if a start button K3 is touched, the control unit 10 causes the image forming unit 12 to print the sheet.

In such a manner, in a case where a sheet is detected in the manual feeding tray 161, only if the inappropriate confirmation condition is not satisfied, the confirmation screen for sheet setting is displayed. With such a configuration, the confirmation screen for sheet setting is displayed for the user at an appropriate timing in accordance with the user's usage situation. As a result, it is possible to realize the digital multi-function peripheral 1 which is more convenient than that in the related art.

Embodiment 2

In Embodiment 2, the present disclosure is not limited to the case where a sheet is set on the manual feeding tray 161. However, also if a sheet is detected in the predetermined sheet feeding cassette 162 or the predetermined document platen 163, the processing of displaying the confirmation screen for sheet setting may be performed in accordance with the procedures of FIGS. 6 and 7.

In such a manner, even in the digital multi-function peripheral 1 which is not equipped with the detection sensor for detecting the type and size of the sheet of the predetermined sheet feeding cassette 162 or the predetermined document platen 163, by displaying the confirmation screen for sheet setting to the user at an appropriate timing in accordance with the user's usage situation, it is possible to realize the digital multi-function peripheral 1 which is more convenient than that in the related art.

Embodiment 3

Next, the overview of the display procedure of the confirmation screen for sheet setting of the digital multi-function peripheral 1 according to Embodiment 3 of the present disclosure will be described with reference to FIG. 11.

Figure 11:
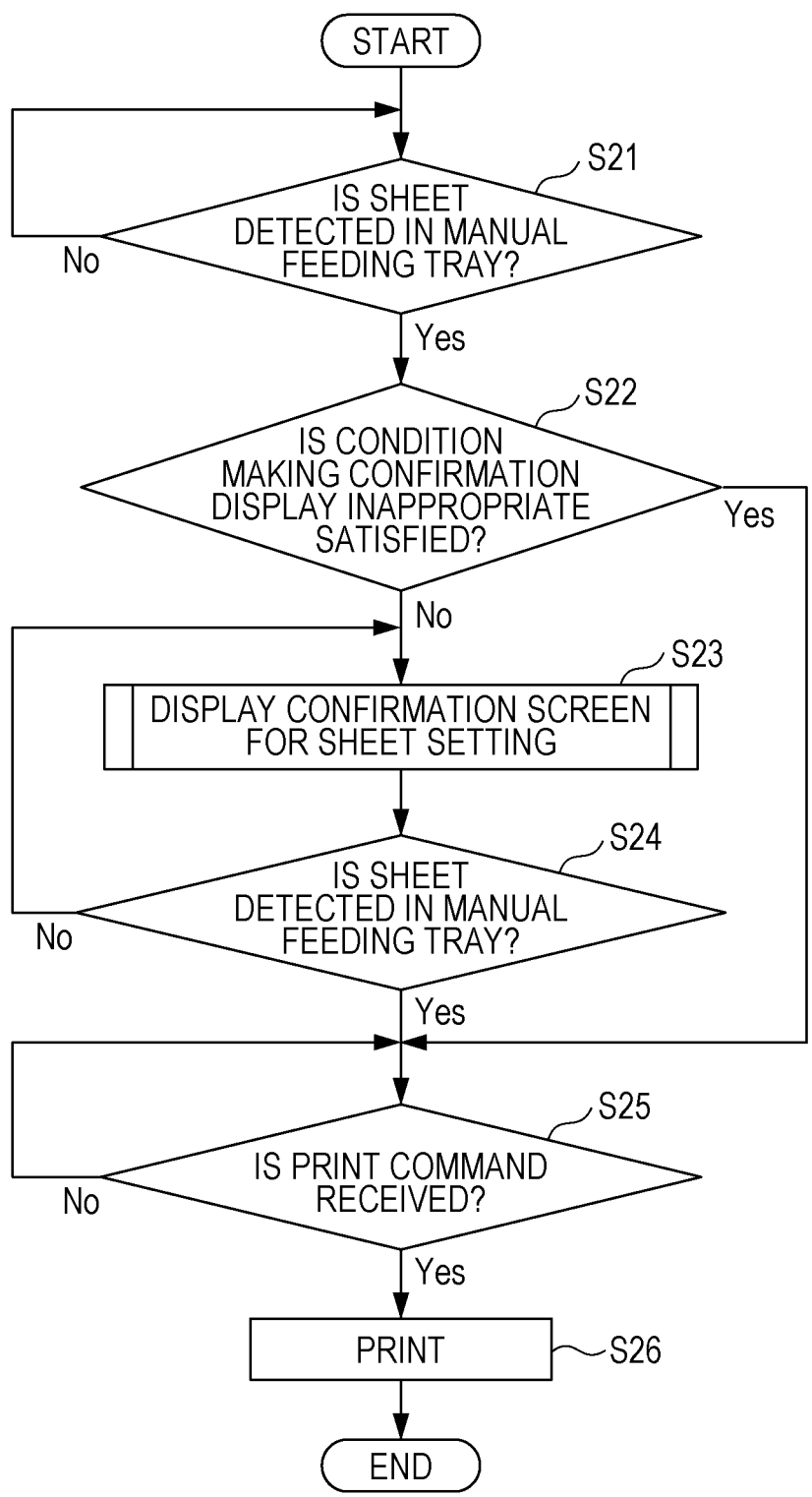
FIG. 11 is a flowchart schematically illustrating a display procedure of a confirmation screen for sheet setting of the digital multi-function peripheral according to Embodiment 3 of the present disclosure.

FIG. 11 is a flowchart schematically illustrating a display procedure of the confirmation screen for sheet setting of the digital multi-function peripheral 1 according to Embodiment 3 of the present disclosure.

Since the processing of steps S21 to S23 and S25 and S26 in FIG. 11 is the same as the processing of steps S1 to S5 in FIG. 6, the description thereof will be omitted.

Here, the processing of step S24 in FIG. 11 will be described.

In a case where the sheet detection sensor stops detecting the sheet placed on the manual feeding tray 161 due to the sheets running out or the like, the same type of sheet is supplemented by the user.

Therefore, in step S23 of FIG. 11, after the confirmation screen for sheet setting is displayed (step S23), the control unit 10 determines whether or not the sheet is detected in the manual feeding tray 161 in step S24 (Step S24).

If a sheet is not detected in the manual feeding tray 161 (if the result of the determination in step S24 is No), the control unit 10 repeats the processing of step S23 (step S23).

In contrast, if a sheet is detected in the manual feeding tray 161 (if the result of the determination in step S24 is Yes), the control unit 10 proceeds to step S25 to make a determination (step S25).

In such a manner, even if a sheet is not detected after a sheet is detected in the manual feeding tray 161, by keeping the confirmation screen for sheet setting displayed before sheets run out, it is possible to realize the digital multi-function peripheral 1 which is more convenient than that in the related art.

Embodiment 4

In Embodiment 4, even when a function setting dialog or the like is being displayed in advance on the display operation unit 171, by displaying the confirmation screen for sheet setting on the display, the original dialog may be displayed after the setting confirmation button is touched.

In such a manner, even after the confirmation screen for sheet setting is displayed on the display operation unit 171 and subsequently the setting confirmation button is touched, the function setting dialog or the like is continuously displayed. Therefore, it is possible to continue the setting, and thus it is possible to realize the digital multi-function peripheral 1 which is more convenient than that in the related art.

Embodiment 5

In the Embodiment 5, a sheet may be supplemented when sheets run out during execution of a job such as printing. This case may also be added to the inappropriate confirmation condition for sheet setting.

In such a manner, there is no need to change she sheet size or type when sheets run out during execution of a job such as printing. Thus, it is possible to realize the digital multi-function peripheral 1 which is more convenient than that in the related art.

Embodiment 6

In Embodiment 6, in a case where the confirmation screen for sheet setting is displayed on the display operation unit 171 while a screen showing the start button K3 of a job such as a basic copy screen in FIG. 10 is being displayed, the start button K3 may be set to be not operable.

In such a manner, it is possible to suppress the start button K3 of the job from being accidentally touched while the confirmation screen is being displayed. Thus, it is possible to realize the digital multi-function peripheral 1 which is more convenient than that in the related art.

Embodiment 7

In Embodiment 7, in a case where a screen not subjected to the display of the confirmation screen for sheet setting is being displayed on the display operation unit 171, switching to the copy screen may be made after a sheet is detected in the manual feeding tray 161. In this case, the confirmation screen for sheet setting may be set not to be displayed on the display operation unit 171.

Here, examples of the "screen not subjected to the display of the confirmation screen for sheet setting" may include a screen in the service person mode. The reason for this is as follows. Since the service person is familiar with the sheet setting operation, even if there is no display for informing this case, the setting mistake does not occur. Further, if the confirmation screen for sheet setting is displayed, the work efficiency is rather low.

In such a manner, by reducing the number of operation procedures in the inspection work of the service person, it is possible to obtain an effect of improving the work efficiency. As a result, it is possible to realize the digital multi-function peripheral 1 which is more convenient than that in the related art.

Embodiment 8

In Embodiment 8, in a case where the setting dialog for the predetermined sheet feeding cassette 162 is being displayed, a sheet may be detected in the manual feeding tray 161. In this case, the confirmation screen for sheet setting may be set to be displayed on the display operation unit 171.

At this time, the sheet feeding cassette 162 is set such that the currently selected sheet feeding cassette 162 is selected. In this state, when the setting change button is touched, the sheet feeding cassette 162 switches to the manual feeding tray 161.

In such a manner, it is possible to obtain the effect of preferentially continuing the current operation without interfering with the setting operation of the currently selected sheet feeding cassette. As a result, it is possible to realize a digital multi-function peripheral 1 which is more convenient than that in the related art.

The preferable embodiments of the present disclosure also include any one combination of the above-mentioned plurality of embodiments.

In addition to the above-mentioned embodiments, there are various modifications of the present disclosure. These modifications are not construed as departing from the scope of the present disclosure. The present disclosure includes meanings equivalent to claims and all modifications within the above scope.

The present disclosure contains subject matter relates to that disclosed in Japanese Priority Patent Application JP 2017-246576 filed in the Japan Patent Office on Dec. 22, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
a sheet tray;
a sheet feeding cassette;
a sheet detection sensor that detects that a sheet is placed on the sheet tray;
a display unit; and
a control unit,
wherein the control unit determines whether or not to cause the display unit to display a confirmation screen for sheet setting in a case where the sheet detection sensor detects the sheet on the sheet tray, the control unit causes the display unit to display the confirmation screen in a case where a predetermined confirmation condition is not satisfied, and causes the display unit to not display the confirmation screen in a case where the confirmation condition is satisfied, when the confirmation screen for sheet setting is displayed while a job start key is displayed by the display unit, the control unit causes the job start key to be inoperable, and when a setting dialog screen of the sheet feeding cassette is displayed while the sheet detection sensor detects the sheet on the sheet tray, the control unit maintains a status of selection of the sheet feeding cassette.

2. The image forming apparatus according to claim 1, wherein the confirmation condition includes a case where the display unit is displaying a sheet setting screen.

3. The image forming apparatus according to claim 1, wherein the confirmation condition includes a case where the display unit is displaying a predetermined operating instruction or a predetermined message.

4. The image forming apparatus according to claim 1, further comprising a user authentication unit, wherein the confirmation condition includes a case where user authentication is not performed by the user authentication unit.

5. The image forming apparatus according to claim 1, further comprising an error notification unit, wherein the confirmation condition includes a case where the error notification unit is displaying an error notification.

6. The image forming apparatus according to claim 1, further comprising a power saving mode switching unit, wherein the confirmation condition includes a case where the power saving mode switching unit performs switching to a power saving mode.

7. The image forming apparatus according to claim 1, wherein the confirmation condition includes a case where image formation is being executed from the sheet tray.

8. The image forming apparatus according to claim 1, wherein in a case where the sheet detection sensor stops detecting the sheet placed on the sheet tray after the display unit displays the confirmation screen, the control unit keeps the display unit displaying the confirmation screen.

9. The image forming apparatus according to claim 1, wherein the status of selection of the sheet feeding cassette is canceled when the status of selection of the sheet feeding cassette is selected.

* * * * *